May 21, 1957 H. W. AUGUSTADT ET AL 2,793,252

TELEPHONE ANSWERING AND MESSAGE RECORDING SYSTEM

Filed Sept. 3, 1952 3 Sheets-Sheet 1

INVENTORS H. W. AUGUSTADT
W. F. KANNENBERG
BY A. F. Kane
ATTORNEY

INVENTORS H. W. AUGUSTADT
W. F. KANNENBERG
BY
A. F. Kane
ATTORNEY

TELEPHONE ANSWERING AND MESSAGE RECORDING SYSTEM

Filed Sept. 3, 1952 3 Sheets-Sheet 3

INVENTORS H. W. AUGUSTADT
W. F. KANNENBERG
BY A. F. Kane
ATTORNEY

United States Patent Office 2,793,252
Patented May 21, 1957

2,793,252

TELEPHONE ANSWERING AND MESSAGE RECORDING SYSTEM

Herbert W. Augustadt, Westfield, and Walter F. Kannenberg, Gillette, N. J., assignors to Bell Telephone Laboratories, Incorporated, New York, N. Y., a corporation of New York Application September 3, 1952, Serial No. 307,684

5 Claims. (Cl. 179—6)

Figure 1:
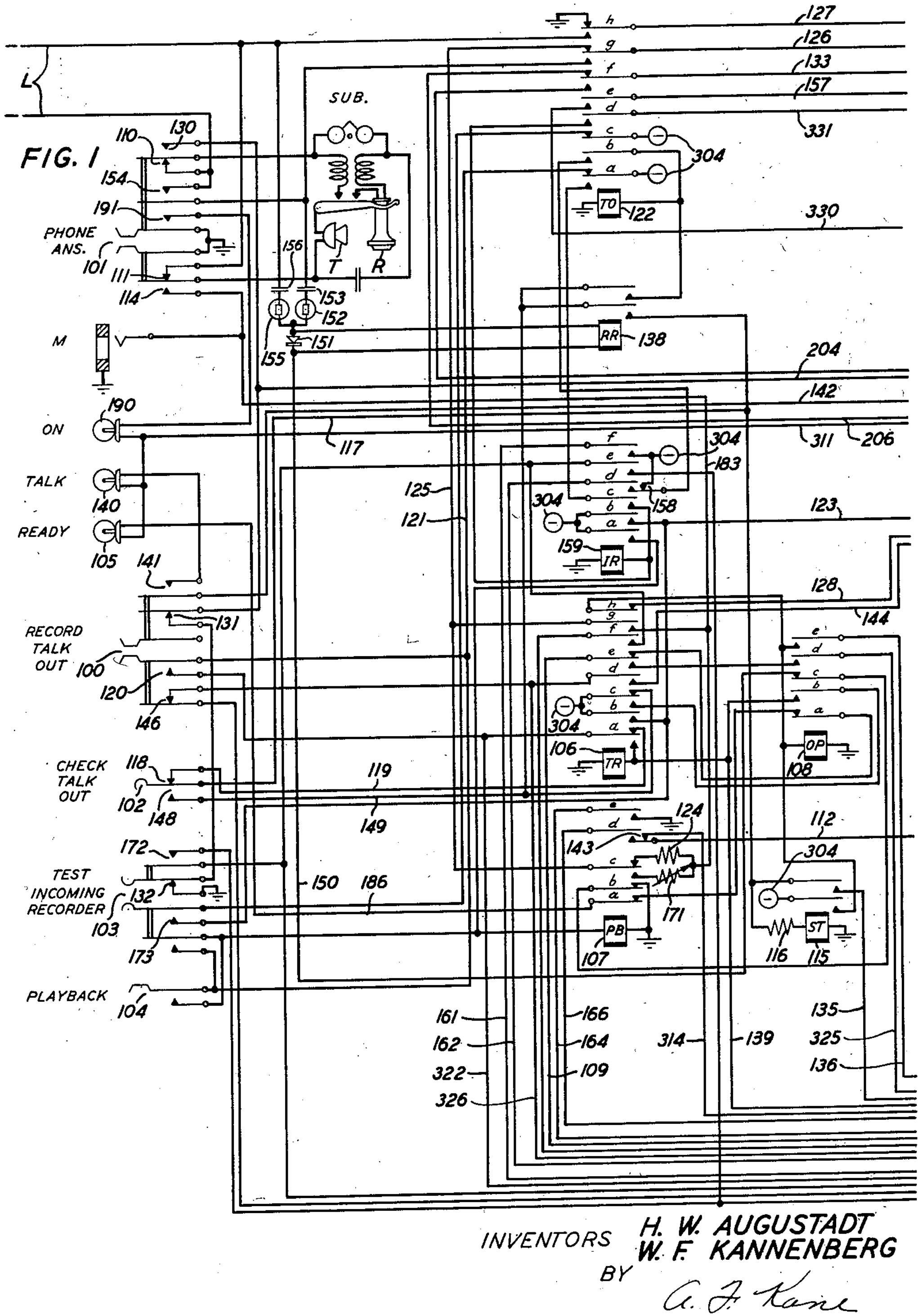

This invention relates to telephone answering and message recording systems.

In systems of the type defined above instrumentalities are employed at a telephone subscriber's station which function, during the absence of the subscriber or when the station is otherwise unattended, to recognize and automatically acknowledge telephone calls incoming to the subscriber's station; to transmit to the calling party a prerecorded message apprising him of the fact that the called subscriber is not available and that any message he may desire to transmit will be recorded; and to record any message transmitted by the calling party for subsequent reproduction by the called party. In general, such instrumentalities comprise two major components, one a so-called "talkout recorder" which serves to transmit the prerecorded informative message to the calling party and the other a so-called "incoming recorder" which serves to record any message the calling party may desire to have delivered to the called subscribed. Such recorders must perform their respective functions in a definite time sequence and, obviously, the operation of the incoming recorder must follow the operation of the talkout recorder and should be initiated substantially immediately following the termination of the time interval allocated to the talkout message.

It is the object of this invention to provide an improved method of and means for initiating the operation of the incoming message recording component of a telephone answering and message recording device and to otherwise improve telephone answering and message recording systems.

This object is attained in accordance with a particular feature of the invention by placing the switching means, which functions to initiate the operation of the incoming recorder and to otherwise condition it for recording, under the control of a tone signal recorded on the recording medium of the talkout recorder.

Another feature of the invention contemplates automatically recording the controlling tone signal on the recording medium of the talkout recorder at the end of a predetermined time interval allocated to the talkout message.

A related feature of the invention comprises, in combination with a telephone answering and message recording device, a tone-operated control circuit which discriminates between speech frequencies and the frequency of the tone signal to preclude false operation of the recorder-switching mechanism when the tone-operated control circuit is subjected to speech signals only. More particularly, the tone-operated control circuit of this invention controls the operation of a switching relay and comprises two channels, one of which is designed to pass the signaling tone and the other of which is designed to block the signaling tone and to pass all other frequencies; it includes means for maintaining a condition of current balance at the grid electrode of a vacuum tube, in the plate circuit of which the switching relay is incluued, when subjected to speech frequencies only and to present an unbalanced condition when the signaling tone is in evidence.

Figure 2:
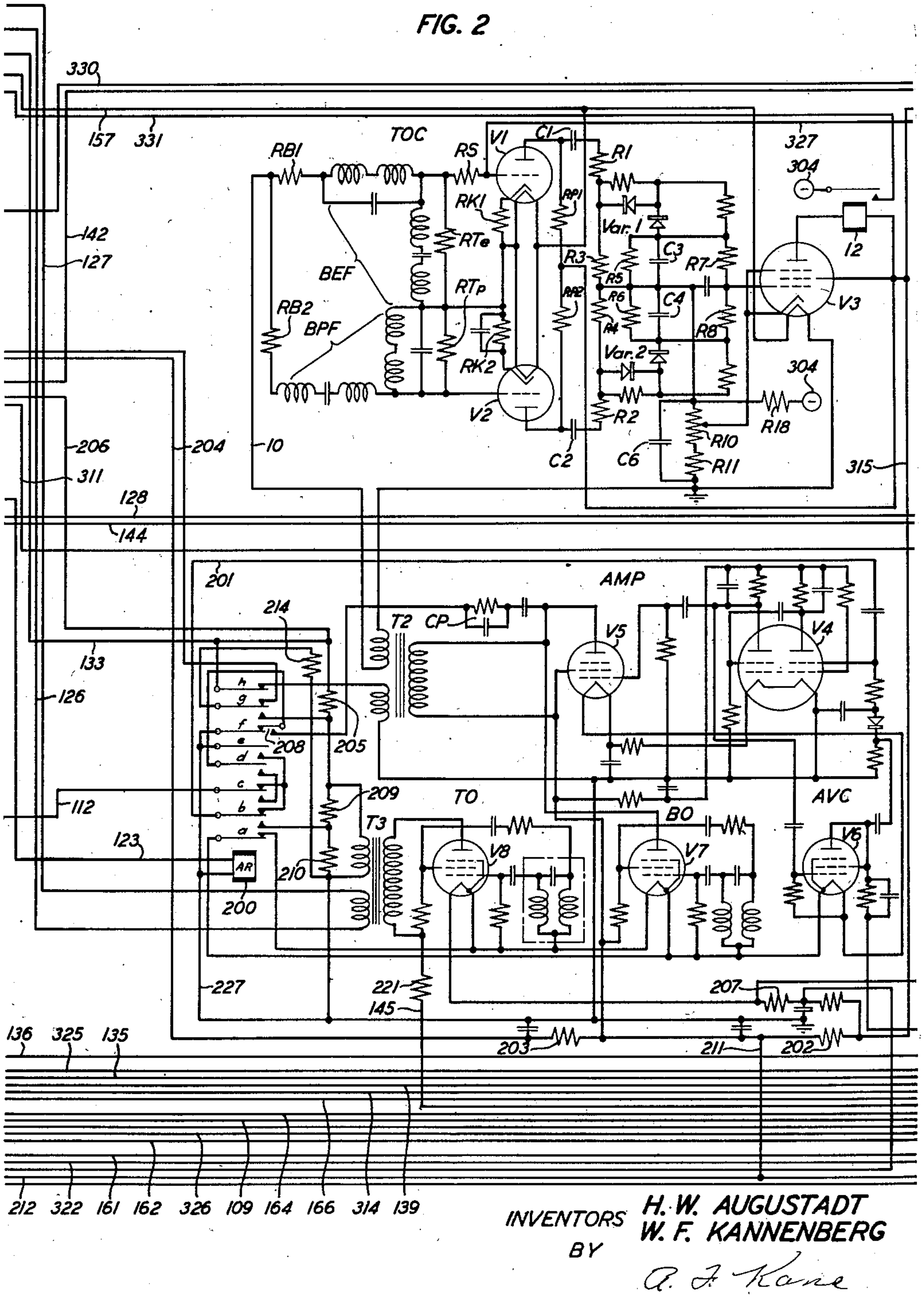
Figure 3:
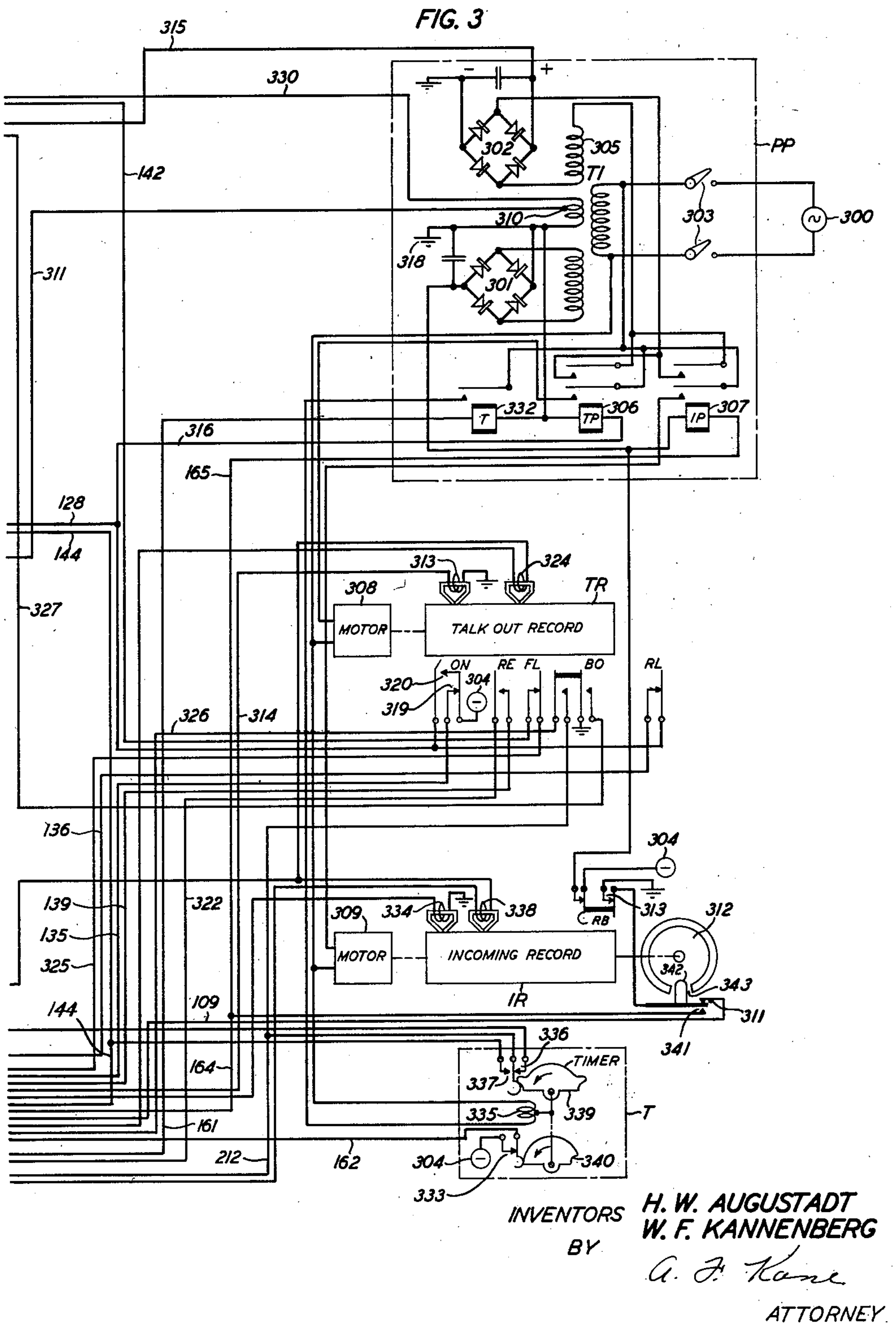

These and other features of the invention will be readily understood from the following description when read with reference to the accompanying drawings, Figs. 1, 2 and 3, of which when placed side-by-side with Fig. 2 between Figs. 1 and 3, constitute a circuit schematic of a telephone answering and message recording system involving the features of the invention.

Before entering into a detailed description of the operation of the illustrated system attention is directed particularly to the upper portion of Fig. 2 wherein the tone-operated control circuit TOC is disclosed. This circuit comprises an input conductor 10, a band-pass filter BPF comprising a series resonant network tuned to the frequency of the signaling tone which is to operate the switching relay 12, and a parallel network shunting all other frequencies to ground; an amplifier V2 for the selected signaling frequency; and a varistor-capacitor-resistor network Var 2—C4—R4—R6—R8 for rectifying the currents of the signaling frequency and for applying a positive direct voltage to the grid of a pentode V3 having the switching relay 12 in its plate circuit.

Since the recording equipment is necessarily subjected to voice currents the possibility of improper operation due to the occurrence of voice currents of the selected signal frequency must be obviated. To this end a guard channel is provided. This channel is also connected to the input conductor 10 and comprises a band elimination filter BEF comprising a parallel resonant circuit tuned to the signal frequency for passing all but the signal frequency and a series resonant circuit for shunting the signal frequency to ground; an amplifier V1; and a varistor-capacitor-resistor network Var 1—C3—R3—R5—R7, for rectifying the non-signal frequencies and for applying a negative direct voltage to the gird of the pentode V3. The signal channel and the guard channel thus apply opposing direct potentials to the grid of tube V3 so that false operation of relay 12 cannot occur since the positive grid voltage applied by the voice currents of the signal frequency will be opposed by the negative grid voltage applied by the voice currents of other than the signal frequency.

The detectors each comprise a varsistor, poled to pass the positive half waves in the signal channel and the negative half waves in the guard channel; a capacitor which attains a charge proportional to the amplitude of the rectified signal; and a discharge resistor shunting the capacitor. To avoid malfunctioning due to starting transients in the system two varistors, with individual equalizing resistors, are used in series in each detector to increase the peak-back voltage rating. The resistors function to tend to equalize the reverse voltage division across the individual rectifier units during the non-conducting interval.

In actual operation the gains in the two channels described are so altered that a desired balance between in-band and out-of-band response is had with regard to the effect on the operation of relay 12. This balance need not be critical.

The filters BEF and BPF are terminated by resistors RT*e* and RT*p* respectively; resistors RB1 and RB2 prevent appreciable shunting effects upon the speech components in the bridging circuit which includes the upper left winding of transformer T2; resistor RS permits killing the upper channel, to prevent "talk down" of relay 12, without unduly affecting the said bridging circuit; resistors RK1 and RK2 are cathode resistors; resistors RP1 and RP2 are plate load resistors; and C1 and C2 are coupling condensers. The amplifier tubes V1 and V2 are high-$\mu$ triodes and may be halves of the same tube.

The circuit to the right of condensers C1 and C2 constitutes an arrangement for adding or subtracting direct-current biases; varistors Var 1 and Var 2 rectify the signals present in the two branches and build up corresponding direct-current voltages across condensers C3 and C4; resistors R3 and R4 are direct-current returns for the rectifiers; resistors R1 and R2 are current limiters; resistors R5 and R6 are discharge controls and resistors R7 and R8 together constitute an output potentiometer. The remaining undesignated resistors are reverse voltage equalizing resistors. Tube V3 is the output tube which controls the operation of relay 12; resistors R10, R11 and R18 with condenser C6 constitute a source of additional plate voltage for tube V3. R10 is a potentiometer which permits the initial grid bias being set on tube V3 so that its plate current at maximum voltage is less than the release current of relay 12.

When a condition of current unbalance is set up at the grid of tube V3 resulting from the presence of the tone signal (1400 cycles) in the input circuit which includes the upper left winding of transformer T2 and conductor 10, relay 12 operates and, as will be pointed out in greater detail hereinafter, causes the operation of relay 106 (Fig. 1) which, in turn, starts the incoming recorder operating and changes the amplifier from a condition of transmitting to one of recording.

The lower portion of Fig. 2 illustrates diagrammatically a three-stage amplifier AMP comprising tubes V4 and V5; an automatic volume control circuit AVC including tube V6; a bias oscillator BO circuit including tube V7 and a tone, or signal oscillator TO including tube V8. The circuits involving these tubes do not, of themselves, constitute any part of the present invention and are of well-known conventional forms. They will be referred to only in general terms throughout the description except where more detailed reference is required for a clearer understanding of the invention.

In Fig. 1 there are shown the key equipment located at the telephone subscriber's station SUB involved in the control of the telephone answering and message recording device and the relay switching equipment involved in such control, while in Fig. 3 there are diagrammatically illustrated other equipments located at the subscriber's station such as the motor-operated talkout and incoming recorders TR and IR, respectively, a timing mechanism T and a power supply PP comprising the full wave rectifiers 301 and 302 which supply direct current from the alternating-current source 300 when the local power switch 303 is in its closed position. The rectifier 301 is employed principally for supplying the switching relays with direct current while the rectifier 302 supplies power to the amplifier AMP and other electronic switching devices involved in the equipment shown in Fig. 2. The direct current supply for the switching relays is indicated at 304 in Fig. 3 and wherever this supply is required throughout the drawings it is represented by a similarly designated circle-enclosed minus sign.

In the stand-by condition of the equipment, with alternating-current power applied from the source 300 by the closure of switch 303, all apparatus is in the condition illustrated in the drawings. No power is connected to the amplifier AMP (Fig. 2) because the uppermost winding 305 of transformer T1 is open at the upper armatures and front contacts of relays 306 and 307, respectively; nor is power connected to the motors 308 and 309 of the talkout recorder TR and the incoming recorder IR, respectively, since the operating circuits for these motors are open at the inner armatures and front contacts of relays 306 and 307, respectively. The only power in use at this time is that applied to the switching rectifier 301 and to the "Ready" lamp 105. The circuit for lamp 105 may be traced from ground at 318 through the center secondary winding of transformer T1 (Fig. 3) to the tap 310, conductor 311, filament of lamp 105, conductor 186, armature *a* and back contact of relay 107, back contact and armature *a* of relay 108, back contact and armature *e* of relay 106, conductor 109, contact 311 of linear indicator 312, contact 313 of switch RB to ground. The lighted condition of lamp 105 indicates that the machine is in condition to perform its functions but is not yet in operation. The lamp 105 is extinguished when the machine is in the process of performing any of its intended functions.

The telephone set SUB at the subscriber's station is normally connected across the line L by way of the normal closed contacts 110 and 111 of "Phone Answer" key 101. To use the device for any purpose except for listening with a separate headset or loudspeaker, the key 101, which is a locking key, must be operated and, obviously, must be released for normal telephone service.

*Record talkout*

In practice, the recording medium of the talkout recorder TR would be provided with a recording comprising two essential portions, one designated the "fixed" portion and the other characterized as the "personal" portion. The "fixed" portion of the recording which may include some standard form of message such as "Mr. John Doe's residence. This line is equipped with a message recording device," may be furnished by the telephone company while the "personal" portion may be recorded by the subscriber.

When it is desired to record the "personal" portion of the talkout message on the recorder TR the "Record Talkout" key 100 and the "Phone Answer" key 101 are operated causing the operation of "start" relay 115 and the lighting of lamp 190. The energizing circuit for "on" lamp 190 may be traced from ground, over the contacts 191 of key 101, filament of lamp 190, conductor 311, tap 310 and lower portion of the middle secondary winding of transformer T1 to ground 318. The operating circuit for relay 115 may be traced from ground, through the winding of relay 115, resistance 116, conductor 117, normal contacts 118 of key 102, conductor 119, back contact and armature *a* of relay 106, closed contacts 120 of key 100, conductor 121, back contact and armature *a* of relay 122 to source 304.

With relay 115 operated, relay 108 operates in an obvious circuit and relay 306 operates in a circuit extending from source 304, over the inner armature and front contact of relay 115, armature *h* and back contact of relay 106, conductor 128, conductor 316, winding of relay 306 to ground at 318.

Relay 306 at its outer armature and front contact completes the connection of the coil 305 of transformer T1 to the rectifier 302 thus applying power to the amplifier. At its inner armature and front contact relay 306 connects motor 308 across the alternating-current source 300 which motor thereupon functions to drive the talkout recorder TR.

When relay 115 operated, it locked in a circuit extending over its outer armature and front contact, conductor 135, to power source 304 by way of contacts 319 of off-normal switch "on" of the talkout recorder TR. The starting of the motor 308 and the consequent operation of the talkout recorder TR causes the opening of contacts 319 of off-normal switch "on" and the closure of contacts 320 thereof, the latter completing a holding circuit for relay 108 which may be traced from ground, through the winding of relay 108, front contact and armature *e* of relay 108, conductor 136, contacts of switch RL of talkout recorder TR, and contacts 320 of switch "on" of the talkout recorder to power source 304. The switch RL determines the length of the personal message.

Relay 108, at armature *a* and its back contact, opens the energizing circuit for Ready lamp 105 which lamp thereupon is extinguished. At armature *c* and its back contact relay 108 opens the circuit to ringing relay 138 thus preventing any incoming call from interrupting the record talkout cycle or permitting false operation of the equipment.

The talkout recorder TR operates under control of its driving motor 308 without serving any apparent function until the recording heads reach a position in which switch RE associated with the recorder is operated. This switch operates when the time allotted to the fixed portion of the talkout message has elapsed and the recorder is to receive and record the personal portion of the message to be supplied by the subscriber.

Recorder switch RE operates momentarily causing relay 106 to operate in a circuit which may be traced from ground, through the winding of relay 106, conductor 139, closed contacts of recorder switch RE, conductor 322, contacts 120 of key 100, conductor 121, back contact and armature *a* of relay 122 to source 304. Relay 106, operated, locks under control of key 100 and relay 122. At its back contact and armature *a* relay 106 opens the operating circuit for relay 115 (over conductor 119, contact 118 of key 102, and conductor 117) causing this relay to release. At its front contact and armature *b* relay 106 completes an operating circuit for relay 200 which may be traced from source 304, over armature *b* and front contact of relay 106, conductor 123, winding of relay 200, conductor 227 to ground.

At its armature *g* and front contact relay 106 shorts-out resistance 124; at armature *h* relay 106 removes the shunt from the contacts of recorder switch RL thus including this switch in the locking circuit of relay 108; at its armature *f* and front contact relay 106 connects the erase coil 324 of the talkout recorder TR across resistance 207 thus supplying the erase coil 324 with power; and at its armature *e* and front contact relay 106 completes the following circuit for Talk lamp 140; from ground at 318, left center secondary coil of transformer T1 to the tap 310, conductor 311, filament of lamp 140, contacts 141 of key 100, conductor 142, switch FL of recorder TR, conductor 325, armature *d* and front contact of relay 108, front contact and armature *e* of relay 106, conductor 109, contacts 311 of switch 312 associated with the incoming recorder IR, right normal contacts of switch RB of the incoming recorder IR to ground. Lamp 140 lights in this circuit as a signal for the subscriber to start talking the personal message into the transmitter T of the telephone at station SUB.

The telephone transmitter T receives power over the following circuit: From the right terminal of rectifier 302 over conductor 315, resistances 202 and 203, conductor 204, contacts 130 of key 101, transmitter coil, switchhook contacts and transmitter T at station SUB, contacts 114 of key 101, conductor 183, front contact and armature *g* of relay 106, conductor 125, back contact and armature *g* of relay 122, conductor 126, lower left coil of transformer T3, conductor 127, armature *h* and back contact of relay 122 to ground, it being understood that the left terminal of rectifier 302 is at ground potential.

Upon noting the lighting of lamp 140 the subscriber speaks the desired personal portion of the talkout message into the telephone transmitter and it is picked up by the recording head 313 and recorded on the recording medium of the talkout recorder TR.

The coil of recording head 313 is connected to the plate of amplifier tube V5 by way of the capacity-resistance network CP, continuity contacts 208 of relay 200, armature *d* and its front contact and front contact and armature *c* of relay 200, conductor 112, continuity contacts 143 of relay 107, conductor 314, and the coil of recording head 313 to ground. The speech signals generated at transmitter T at station SUB and impressed on the lower left coil of transformer T3 over the path previously traced are inductively impressed on the upper left coil of transformer T3 across which resistances 209 and 210 are bridged, thence by way of the front contact and armature *b* of relay 200 and conductor 201 to the amplifier input at tube V4. Thus any message which the subscriber speaks into the transmitter T is amplified and recorded on the recording medium of the talkout recorder TR by the recording head 313. The shorting of resistance 124 as previously described permits recording at the highest level.

As previously described the erase head 324 is activated at the same time the recording head is activated so that any message which may have been recorded previously on the recording medium of the recorder is erased before a new message is recorded.

A predetermined time (approximately seven seconds) before the end of the time allotted to the personal talkout message switch FL of the recorder TR is intermittently operated in any well-known manner causing the Talk lamp 140 to flash several times as a signal to the subscriber that the time for recording the personal message is about to terminate. After flashing several times the lamp circuit is held open for about five seconds keeping the lamp extinguished.

Approximately three seconds before the end of the personal talkout time the recorder switch BO is operated causing the tone oscillator TO to be energized. The energization of the tone oscillator is effected over the following circuit: From the right terminal of rectifier 302 over conductor 315, resistance 202, conductors 211 and 212, left contacts of recorder switch BO, conductor 326, armature *d* and front contact of relay 106, conductor 144, resistance 221 to tube V8 of the tone oscillator.

At its right contact recorder switch BO connects ground to the grid of tube V1 of the tone operated control circuit TOC by way of conductor 327. The switch BO is arranged to operate seven seconds after the start of the operation of switch FL and remains closed for a minimum of four seconds.

The tone oscillator TO functions, in a well-known manner, to generate a tone signal of predetermined frequency (1400 cycles) and this signal is impressed on the right, or primary coil of transformer T3 and thence by induction on the upper left secondary coil of transformer T3 to the amplifier input (the grid of the right section of tube V4) by way of resistances 209 and 210, the front contact and armature *b* of relay 200 and conductor 201. Since the amplifier output is now connected to the recording head 313 of the talkout recorder TR the tone signal generated by the tone oscillator TO is recorded on the recording medium of the talkout recorder TR.

Three seconds after the operation of recorder switch BO the recorder switch RL is operated opening the locking circuit for relay 108 and causing the release of this relay. The release of relay 108 at this time prevents the Talk lamp 140 from lighting after the completion of operation of the recorder switch FL.

If the Record Talkout key 100 is left in its operated position relay 106 remains operated to hold disabled the contacts of ringing relay 138 and also to maintain open the circuit to the Ready lamp 105. The talkout recorder TR will run for the remainder of the talkout cycle after which switch "on" will release causing the release of relay 306 which stops the talkout motor 308 and removes power from the amplifier. A "don't answer" indication is presented to the line L under these conditions. When the key 100 is released it removes battery from the amplifier AMP through contacts of relay 122; releases relay 106 which enables the contacts of ringing relay 138; lights the Ready lamp 105; disables the tone oscillator TO; and releases relay 200. The device thus is restored to normal condition.

If the subscriber at station SUB finishes the personal recording within the allotted time and releases key 100 the Talk lamp 140 will be extinguished; the telephone transmitter T will be disabled; and tone will be recorded on the talkout recorder TR, until the operation of recorder switch RL, by means of the break contacts 146 of key 100 energizing the tone oscillator TO. Operation of switch RL releases relay 108 which, in turn, releases relay 106. Release of relay 106 again operates relay 108;

disables the tone oscillator TO; removes erase power from the erase head 324 of the talkout recorder TR; and releases relay 200. At the conclusion of the talkout cycle the switch "on" of the talkout recorder TR releases causing relays 108 and 306 to release. Release of relay 108 enables the operate path for ringing relay 138 and lights the Ready lamp 105. Release of relay 306 stops the talkout recorder motor 308 and removes power from the amplifier. The device thus is restored to normal.

*Check talkout*

When the subscriber wishes to play back the talkout message the Check Talkout key 102 is operated momentarily. "Start" relay 115 thereupon operates in a circuit extending from ground over the winding of relay 115, resistance 116, conductor 117, alternate contacts 148 of key 102, conductor 149, back contact and armature *c* of relay 106 to power source 304. Relay 115 locks in a circuit which may be traced from ground, over winding of relay 115, resistance 116, outer armature and front contact of relay 115, conductor 135, contacts 319 of talkout recorder-switch "on" to power source 304.

Relay 108 operates over an obvious circuit and relay 306 operates in the circuit previously described under Record Talkout. Relay 108 extinguishes the Ready lamp 105 and disables the operate path of relay 138. Relay 306 applies power to the talkout recorder motor 308 and to the amplifier AMP as described hereinbefore.

The starting of the talkout recorder TR causes the operation of recorder switch "on" which locks up relay 108 and releases relay 115. The recording head 313 is now connected to the amplifier input over a circuit extending from ground, winding of the recording head 313, conductor 314, continuity contacts 143 of relay 107, conductor 112, armature *c* and back contact, and back contact and armature *b* of relay 200, and conductor 201; the subscriber's telephone set at station SUB is connected to the amplifier output in a circuit which may be traced from ground over the back contact and armature *h* of relay 122, conductor 127, lower left coil of transformer T3, conductor 126, armature *g* and back contact of relay 122, conductor 125, armature *c* and back contact of relay 107, resistance 124, conductor 183, contacts 114 of key 101, the telephone set at station SUB, contacts 130 of key 101, contacts 131 of key 100 and contacts 132 of key 103 to ground. The lower left coil of transformer T3 is inductively coupled to the upper coil thereof which is connected to the lower left coil of transformer T2 by way of resistance 205 and armature *h* and back contact of relay 200. The lower left coil of transformer T2 is, of course, inductively coupled to the right coil of transformer T2 which is connected across the output of the amplifier AMP. The recorded talkout message, therefore, is picked up in the receiver R of the subscriber's telephone set and heard by the listening subscriber.

At the conclusion of the talkout message the previously recorded tone is applied to the amplifier but performs no useful function at this time.

At the conclusion of the talkout cycle, the device is restored to normal by the release of recorder switch "on" and the consequent release of relays 108 and 306. Relay 108, released, enables the operate path of the ringing relay 138 and lights the Ready lamp 105 which indicates that the device is available for another operation. Relay 306 removes power from the amplifier and from the talkout recorder motor 308.

*Telephone answering*

When the subscriber at station SUB wishes to have the telephone answered and otherwise attended during his absence he operates the Phone Answer key 101. This operation disconnects the telephone set from the line L and associates it with the telephone answering and message recording equipment at his station.

Under this condition the recording head 313 of the talkout recorder TR is connected to the amplifier input in a circuit which includes ground, the coil of recording head 313, conductor 314, continuity contacts 143 of relay 107, conductor 112, armature *c* and back contact, and the back contact and armature *b* of relay 200 and conductor 201; the amplifier line output at the primary winding of transformer T2 is connected to the telephone set in a manner previously described. Also ringing relay 138 is connected to the line L in a circuit which extends from ground, over the back contact and armature *b* of relay 107, armature *c* and back contact of relay 108, conductor 150, the winding of relay 138 which is bridged by the dry rectifier 151, and thence to one side of the line by way of thermistor 152, condenser 153 and contacts 154 of key 101 and to the other side of the line by way of thermistor 155 and condenser 156. The ringing circuit just traced in so far as the thermistor-condenser combinations are concerned is similar to that shown and described in detail in M. E. Krom Patent No. 2,160,507 of May 30, 1939.

When a call arrives at the station SUB relay 138 responds to the ringing current applied to the line and causes relays 115 and 122 to operate in parallel in circuits which include the two armatures and front contacts of relay 138 and the back contact and armature *c* of relay 106.

Relay 122, operated, disables keys 102, 103 and 104; enables the filament circuit of the tone operated circuit TOC which may be traced from ground, through the center secondary coil of transformer T1, conductor 330, front contact and armature *e* of relay 122 and conductor 157; inserts resistance pad 214 in the amplifier output for the talkout cycle (this pad, as will be described later, is removed on incoming recording by the operation of relay 200); at armatures *h* and *g* transfers the amplifier from the telephone set to the line L; and at armature *b* and its front contact locks up through the continuity contacts 158 of relay 159.

The operation of relay 115 causes relays 306 and 108 to operate in circuits previously traced to start the talkout cycle. The recording head 313 of the talkout recorder TR is now connected to the amplifier input by way of conductor 314, continuity contacts 143 of relay 107, conductor 112, armatures *c* and *b* of relay 200 and their respective back contacts and conductor 201, so that the previously recorded message including the fixed and personal portions thereof is impressed on the amplifier input, amplified and impressed on the line L. The output circuit may be traced from the upper conductor of line L, over front contact and armature *h* of relay 122, conductor 127, lower left coil of transformer T3, conductor 126, armature *g* and front contact of relay 122, contacts 154 of key 101 to the other conductor of line L. The lower left coil of transformer T3 is inductively coupled to the upper left coil of transformer T3 which, in turn, is connected to the lower left coil of transformer T2 by way of armature *h* of relay 200 through parallel circuits one of which includes resistors 210, 209, and 205, and the other of which includes resistor 214, armature *g* of relay 200, armature *f* of relay 122 and conductor 133, which lower left coil of transformer T2 constitutes the line output coil of amplifier AMP. Thus the talkout message is transmitted over the line L to the calling subscriber.

When the talkout cycle started, the Ready lamp 105 was extinguished when relay 108 operated and the operating circuit of relay 138 was opened at the same time whereupon relay 138 releases.

It will be recalled that the recording medium of the talkout recorder has three seconds of tone recorded thereon immediately following the personal portion of the talkout message. With the conclusion of the talkout message the recorded tone is impressed on the amplifier input, through the amplifier and thence by way of the primary and upper secondary coils of transformer T2 to the tone operated control circuit TOC over conductor 10. This circuit functions in the manner previously described to effect a potential unbalance at the grid electrode of tube V3 causing space current to flow in the plate circuit which includes the winding of relay 12. Relay 12 accordingly operates.

At its armature and front contact relay 12 completes an energizing circuit for relay 159 which includes conductor 331, armature *d* and front contact of relay 122, conductor 160, winding of relay 159 and ground.

At its armature *a* and front contact relay 159 completes an obvious operating circuit for relay 107; at its armature *b* and front contact it completes an operating circuit for relay 200 by way of conductor 123, winding of relay 200, to ground on conductor 227; at its armature *f* and front contact it completes an operating circuit for relay 332 by way of conductor 161, winding of relay 332 and ground at 318. At its armature *c* and front contact relay 159 locks under control of armature *a* of relay 122; at its armature *d* and front contact its transfers the locking circuit for relay 122 from a path through relay 138 operated and relay 106 unoperated to the contacts 333 of timer T by way of conductor 162; and at armature *e* and front contact it connects the erase coil 338 of the incoming recorder IR across resistance 207 for the purpose of supplying erase power to the coil.

Relay 107 at armature *a* and back contact opens the circuit to lamp 105 and at armature *b* and back contact opens the operate path to relay 138. At armature *e* and front contact relay 107 completes an operating circuit for relay 307 which extends from ground over the front contact and armature *e* of relay 107, conductors 164 and 165, winding of relay 307, and the left terminal of rectifier 301, the right terminal of which is grounded at 318. At armature *d* conductor 112 is switched from conductor 314 to conductor 166 thereby disconnecting the recording head 313 of the talkout recorder TR from the armature *c* of relay 200 and substituting therefor the recording head 334 of the incoming recorder IR.

Relay 200, operated, places the amplifier in condition to record. More particularly, the conductor 112 which, by way of armature *c* and its back contact and the back contact and armature *b* of relay 200 is normally connected to the amplifier input conductor 201 is now connected to the amplifier output (plate of tube V5) by way of the continuity contacts 208, armatures *d* and *c* and their associated front contacts of relay 200 and the CP filter.

Relay 307, operated, applies power from source 300 by way of its inner armature and front contact to motor 309 which drives the incoming recorder IR, and at its outer armature and front contact closes the power supply circuit to the amplifier.

Relay 332, operated, connects the timer motor 335 across the source 300 whereupon the timer T starts to operate.

A short tone signal recorded on the talkout recorder has previously been sent out on the line L. With the operation of the timer T the automatic volume control AVC of the amplifier is disabled momentarily incident to the opening of timer contacts 336 by cam 339 which removes power from the plate of tube V6 and the tone oscillator TO is momentarily energized by the closure of timer contacts 337 which puts direct-current voltage on the plate of tube V6, it being understood that the movable timer spring associated with the contacts 336 and 337 is connected to the power source 302 by way of conductors 212 and 211, resistance 202 and conductor 315. This second short tone is transmitted out over the line L as a signal to the calling party to begin his message.

The message transmitted from the calling station to station SUB by the calling party is recorded on the incoming message recorder IR by means of the recording head 334. As previously described the erase coil 338 is energized due to the operation of relay 159 so that any message which may be on the recording medium of the incoming recorder IR is erased before the incoming message is recorded. The speech transmission path from line L to the recording head 334 may be traced as follows: From the upper conductor of line L over the front contact and armature *h* of relay 122, conductor 127, through the lower left coil of transformer T3, conductor 126, armature *g* and front contact of relay 122, contacts 154 of key 101 to the lower conductor of line L. This couples through the upper left coil of transformer T3, one side of which is directly grounded through conductor 227 and whose other side is grounded through resistor 209 and front contact and armature *b* of relay 200, conductor 201 to the amplifier input, through the amplifier to the amplifier output, network CP, continuity contacts 208 of relay 200, armatures *d* and *c* and the corresponding front contacts of relay 200, conductor 112, front contact and armature *d* of relay 107, conductor 166, and the coil of recording head 334 of incoming recorder IR.

Near the end of the time provided for the incoming message the timer cam 339, rotating counterclockwise as indicated, again causes the momentary opening of contacts 336 which disables the AVC and closure of contacts 337 which causes another single tone to be sent out on the line, it being observed that the tone signal is tranmitted to the line L from the tone oscillator TO by way of the right and lower left coils of transformer T3 as previously described. This signal is to advise the calling subscriber that the recording time is about to terminate.

Immediately following the transmission of the last single tone over the line L the timer cam 340 functions to open contacts 333 thereby interrupting the locking circuit of relay 122 whereupon this relay releases and causes relay 159 to release which, in turn, restores the incoming recorder portion of the circuit to normal.

Relays 107 and 108 are released before the operate path of relay 138 is restored and the Ready lamp 105 relighted. This provides that both talkout and incoming record cycles are completed before the device will accept another incoming call or be ready for any other operation.

When the incoming recorder reaches the end of its available recording space, switch RB on the incoming recorder opens the switching power circuit and releases all relays, turning off the equipment and presenting a "don't answer" condition to the line

*Incoming recorder indexing*

To place the incoming recorder head 334 to the start of the recording track, the head is lifted and moved back manually until the linear indicator 312 is at zero which opens contacts 311 to thereby extinguish Ready lamp 105 and closes contacts 341 which results in the energization of relay 307 over an obvious circuit. Relay 307, operated, applies power to the incoming recorder motor 309. The head is then released and after a predetermined interval the cam 342 drops into the slot 343 allowing the head to engage a lead screw in the recorder mechanism in the proper place and releasing relay 307 which stops the motor 309. The Ready lamp is then lighted and the device is in normal condition. This mechanism does not constitute a part of the present invention and need not be disclosed in detail.

*Playback*

To play back the message or messages recorded on the incoming recorder IR, the recording head is indexed as described. The Playback key 104 and Phone Answer key 101 are then operated by the subscriber at station SUB. Relay 107 thereupon operates in a circuit extending from power source 304, armature *a* and back contact of relay 122, conductor 121, contacts of key 104, winding of relay 107 to ground.

Relay 107 operated, extinguishes the Ready lamp 105 at its armature *a* and back contact; at armature *b* and back contact it disables the circuit to ringing relay 138; at armature *c* and front contact it includes the volume control resistor 171 in the telephone circuit; at armature *d* and front contact it connects the incoming recorder head 334 to the amplifier input; and at armature *e* and front contact it completes an operating circuit for relay 307 which includes conductors 164 and 165, winding of relay 307 to the left terminal of rectifier 301.

Relay 307 applies power to the incoming recorder motor 309 and to the amplifier in a manner previously described. The incoming recorder IR then operates in playback condition until the switch 104 is released or the head 334 reaches the end of the sound track and switch RB is operated. The recorded message or messages are thus transmitted to the telephone set and heard in the receiver R thereof.

*Test incoming recorder*

If it is desired to test the recording operation of the incoming recorder or to indicate the end of a specific group of recorded messages by means of a personal message, the incoming recorder head 334 is set to the desired section of sound track. The Test Incoming Recorder key 103 is then operated and held in operated position. The circuit operation is then the same as in playback except that the key contacts 132, 172 and 173 function to effect the operation of relay 200; to enable the telephone transmitter T; and to apply erase power to the incoming recorder head 338, placing the machine in condition to record. Release of key 103 restores the circuit to normal.

What is claimed is:

1. In a telephone answering and message recording system, a telephone line, a subscriber's station on said line, a talkout recorder having a recording medium, an incoming message recorder at said station, means at said station for recording a tone signal of predetermined frequency on the recording medium of said talkout recorder, means for conditioning said incoming recorder to record a message incoming over said line, and means controlled by the recorded tone signal of predetermined frequency for operating said recorder-conditioning means comprising a tone operated control circuit including a grid-controlled electronic tube and means for applying equal and opposite direct-current voltages to said grid, one voltage corresponding to voice currents of the said predetermined frequency and the other voltage corresponding to voice currents of other than the said predetermined frequency, and a relay in the output circuit of said tube.

2. The combination in a telephone answering and message recording system of a telephone line, a message recording device, and means for enabling said message recording device to record a voice frequency message incoming over said line, said device including a source of tone of predetermined frequency, a grid-controlled electronic tube having a plate circuit, means for applying to the grid of said tube a positive direct-current voltage corresponding to voice frequency currents of the said predetermined frequency, means for applying to the grid of said tube a negative direct-current voltage corresponding to voice currents of other than the said predetermined frequency whereupon a condition of current balance is maintained at said grid in the absence of a signal from said source of tone thereby rendering said tube normally non-conducting, means for subjecting said enabling means to current from said tone source whereby the normal condition of balance at said tube grid is disturbed and said tube is rendered conductive, and a switching device in the plate circuit of said tube.

3. In combination in a telephone answering and message recording system, a telephone line, a station on said line, a talkout recorder at said station having a recording head, a tone oscillator for producing a tone signal of predetermined audio frequency, means at said station for initiating the operation of said talkout recorder, means controlled by said talkout recorder for enabling said tone oscillator, whereupon said oscillator functions to generate a tone signal of predetermined audio frequency, means for impressing the generated audio tone signal on the recording head of said talkout recorder for recording on the recording medium thereof, an incoming recorder at said station, switching means for enabling said incoming recorder, a tone operated control circuit for controlling the operation of said switching means, said circuit having an input and an output, means for connecting the recording head of said talkout recorder to the input of said tone operated circuit to subject said tone operated circuit to the tone signal recorded on the recording medium of said talkout recorder, and means in the output of said tone operated control circuit for operating said recorder-enabling switch means.

4. In a telephone answering and message recording system, in combination; a telephone line arranged to have signalling current applied thereover at times; a subscriber's station on said line and including a transmitter and a receiver; a talkout recorder at said station; a recording medium for said talkout recorder; means for generating a tone of a predetermined frequency; first switching means manually operable for connecting the transmitter of said station and said generating means to said talkout recorder for recording information on the recording medium thereof and for recording said tone on said recording medium; second switching means manually operable for conditioning said system for operating automatically when signaling current is applied over said line; signal receiving means responsive to said tone frequency; first circuit means operable in response to said signaling current when applied to said line to connect the output of said talkout recorder to said signal receiving means and to said line; an incoming recorder at said station; a recording medium for said incoming recorder; a timer; second circuit means controlled by the operation of said signal receiving means to disable said talkout recorder and to enable said incoming recorder to accept an incoming message and to start said timer to time a prescribed period of time and to connect said incoming recorder to said line and to said signal receiving means; said timer when started controlling said generating means to generate a tone when said incoming recorder is enabled and again at the end of said prescribed period of time; third circuit means responsive to the operation of said signal receiving means at the end of said prescribed period of time for disabling said incoming recorder and said talkout recorder and said generating means and said signal receiving means and for stopping said timer; and, third switching means manually operable for enabling said incoming recorder and for connecting said incoming recorder to the receiver at said station to play back said recorded incoming message.

5. In a telephone answering and message recording system, in combination; a telephone line arranged to have signaling current applied thereover at times; a subscriber's station on said line and including a transmitter and a receiver; an amplifier at said station; a talkout recorder at said station; a recording medium for said talkout recorder; a tone oscillator at said station for generating a tone of a predetermined frequency; first switching means manually operable for connecting the transmitter of said station to said talkout recorder for recording information on the recording medium thereof; second switching means manually operable for connecting said oscillator to said talkout recorder for recording said tone on said recording medium at the end of said talkout record; third switching means manually operable for conditioning said system for operating automatically when signaling current is applied over said line; a ringing relay at said station operable in response to said signaling current when applied to said line; a tone operated control circuit comprising a grid controlled electron discharge tube and two channels responsive to particular frequencies; said two channels, one of which passes only said tone frequency and the other of which blocks said tone frequency, maintaining a condition of current balance on the grid of said tube to prevent a discharge therein in the absence of said tone frequency and current unbalance to permit a discharge therein when said tone frequency is present; first circuit means responsive to the operation of said ringing relay for connecting the output of said talkout recorder to said control circuit and to said line both through said amplifier; a switching relay operable by a discharge in said tube; an incoming recorder; a recording medium for said incoming recorder; a timer; second circuit means controlled by the operation of said switching relay to disable said talkout recorder, to enable said incoming recorder to accept an incoming message, to start said timer to time a prescribed period of time, and to connect said incoming recorder to said line and to said control circuit both through said amplifier; said timer when started controlling said tone oscillator to generate a tone when said incoming recorder is enabled and again at the end of said prescribed period of time; third circuit means responsive to the operation of said switching relay at the end of said prescribed period of time for disabling said incoming recorder and said talkout recorder and said amplifier and said tone oscillator and said control circuit and for stopping said timer; and, fourth switching means manually operable for enabling said incoming recorder and said amplifier and for connecting said incoming recorder through said amplifier to the receiver at said station to play back said recorded incoming message.

References Cited in the file of this patent

UNITED STATES PATENTS

| | | |
|---|---|---|
| 2,116,314 | Jenking et al. | May 3, 1938 |
| 2,533,234 | Edwards | Dec. 12, 1950 |
| 2,673,241 | Van Deventer et al. | Mar. 23, 1954 |